United States Patent Office 2,933,429
Patented Apr. 19, 1960

2,933,429

METHOD OF REPELLING RODENTS COMPRISING APPLYING A MEMBER OF THE GROUP CONSISTING OF AN ETHYLENE DINITRILE AND ETHYLENE DICARBOXYLIC ACID ESTERS

Thomas H. Wicker, Jr., and Newton H. Shearer, Jr., Kingsport, Tenn., assignors to Eastman Kodak Company, Rochester, N.Y., a corporation of New Jersey No Drawing. Application August 22, 1956
Serial No. 605,463

5 Claims. (Cl. 167—46)

This invention relates to compounds that are effective in repelling rodents such as mice, squirrels, beavers, porcupines and rabbits and to compositions containing such compounds.

It has been estimated that in storage warehouses, the rodent damage to stored foods is as high as 20% of the total value of those foods. The need for compounds or materials which will effectively repel rodents from such stored foods has been generally recognized, not only by warehousemen, but also by farmers, food processors, householders, etc. The annual economic loss due to rats and other rodents has been estimated at between one and two billion dollars.

The Fish and Wildlife Service of the U.S. Department of the Interior has tested more than 2,700 chemicals as rodent repellents. Only a few are considered at present to have merit as rodent repellents: for example, actidione, zinc dimethyldithiocarbamate-cyclohexylamine complex, tetramethylthiuram disulfide, rosin amine D, and complexes of trinitrobenzene such as the aniline complex. Actidione, an antibiotic, is too expensive for commercial use and is employed only as a laboratory standard. Examples of classes of compounds which are considered active repellents are the guanidines, the primary, secondary and tertiary amines and their salts with acetic, hydrochloric and picric acids, nitro compounds, phenols, quaternary ammonium salts and thiocyanates. Amides, acids, alcohols, ethers, esters, and nitriles have been generally ineffective.

It is an object of this invention to provide new compounds which are effective rodent repellents. It is another object of this invention to provide rodent repellents which are more economical than the presently employed rodent repelling agents.

Although nitriles and esters, as classes, have not been considered to be effective rodent repellents, we have found that certain nitriles and esters have rodent repellency properties. The compounds within the scope of this invention are set forth in the structural formula below and they are characterized by having either two cyano or two ester radicals in their structural formulas. The highest rodent repellency index previously reported for a nitrile is 95.1 for 1-naphthonitrile at a 2% concentration. The activity of this compound as a rodent repellent has, however, been attributed to the presence of the 1-naphthyl group. Also, 1-butyl-3-cyanoguanidine showed a rodent repellency index of 93.5 at a 2% concentration, but, here again, the rodent repellency of this compound is attributable to the presence of the guanidine radical.

The rodent repellent compounds within the scope of this invention have the structural formula:

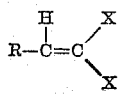

wherein R is a lower alkyl radical containing 1 to 4 carbon atoms, phenyl or chloro-substituted phenyl and X is either —CN or —COOR′, wherein R′ is a lower alkyl radical containing 1 to 4 carbon atoms. The compounds within the scope of this invention thus contain either two cyano radicals or two ester radicals. Specific compounds within the scope of this invention are α-cyano-β-phenylacrylonitrile, diethyl ethylidene malonate, α-cyano-β-(o-chlorophenyl) acrylonitrile and α-cyano-β-(p-chlorophenyl) acrylonitrile.

Evaluation of the rodent repellent activity of these compounds was carried out by use of a food acceptance technic which is described in the following publication: Rodent Repellent Studies, I. Development of an Index Number for Expressing Degrees of Repellent Activity, E. Bellack, J. B. De Witt, J. Am. Pharm. Soc. (sci. ed.), 38 (2) 109–112 (1949). According to this technic, healthy young rats are used, together with a normal rat food, which may be a standard laboratory diet for rats, which is adequate for normal growth and reproduction. The food was ground to pass a 10-mesh standard screen, and the treated food generally contained 2% by weight of the sample being tested, well mixed with the food. The following procedure is quoted from page 110 of the above article:

"Each experimental group consisted of three or more rats, housed in individual cages, and furnished water ad libitum. The rats had been maintained on the untreated experimental diets for a period of at least one week prior to the start of the test. At the beginning of the test, each animal was provided with a suitable food cup containing 20 gm. of the untreated food, and a similar cup containing 20 gm. of the treated food. No other food was available to the rats during the test period. The amount of food remaining in the cups was weighed each twenty-four hours during the four-day experimental period, and the cups returned to the cages. The animals, and any residual food, were discarded at the end of the experiment."

By a formula explained in the above article, a repellency index is calculated for any given material under test.

An index number greater than 85 is indicative of repellent activity and 100 is the highest possible index number. The materials described in this invention were tested at a 2% concentration in the food.

*Example 1.—α-Cyano-β-phenylacrylonitrile*

The bioassay procedure involving a food acceptance test referred to above was used to obtain an index number of 100 at 2.0% concentration for α-cyano-β-phenylacrylonitrile. At a 1% concentration, an index number of 97.0 was obtained while at 0.5% concentration, the index number was 96.0

*Example 2.—Diethyl ethylidene malonate*

The bioassay procedure of Example 1 was used to obtain an index of 97 at 2.0% concentration for diethyl ethylidene malonate.

*Example 3.—α-Cyano-β-(o-chlorophenyl)acrylonitrile*

The bioassay procedure involving a food acceptance test referred to above was used to obtain an index number of 91.0 at 2.0% concentration for α-cyano-β-(o-chlorophenyl) acrylonitrile.

*Example 4.—α-Cyano-β-(p-chlorophenyl)acrylonitrile*

The bioassay procedure of Example 1 was used to obtain an index of 93.0 at 2.0% concentration for α-cyano-β-(p-chlorophenyl) acrylonitrile.

Examples of foods in which the repellents of the invention are effective are: a standard laboratory diet for rats or such foods as wheat, rice, corn, barley, grass seed, etc. In some instances it is undesirable to incorporate the rodent repellents in the foods, but in such instances the foods can be protected by surrounding the foods with a barrier containing the rodent repellent either directly incorporated into the barrier or applied externally as a coating in a suitable carrier. Frequently the container for the material normally attacked by rodents can form the barrier. For example, materials normally attacked by rodents can be stored or shipped in bags or paperboard containers, and in accordance with this invention these materials can be protected from damage by rodents by incorporating a rodent repellent, as described above, in or on the surface of the container.

The nitriles of this invention can be prepared by the reaction in ethanol between equivalent quantities of an aldehyde, such as benzaldehyde, and malononitrile in the presence of a few drops of piperidine. The exothermic reaction mixture becomes reddish in color and within about fifteen minutes the mixture is solid with crystalline condensation product. The product can be recrystallized from ethanol. The esters of this invention can be prepared according to the method used by V. Auwers and Eisenlohr, J. prakt. chem. (2), 84, 101, to prepare diethyl ethylidene malonate.

We claim:
1. A method for protecting property and materials normally consumed as food by rodents from rodents by imparting rodent repellency thereto which comprises applying to said property and materials a compound having the structural formula:

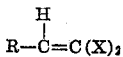

wherein R is selected from the group consisting of alkyl radicals containing 1–4 carbon atoms, phenyl and chlorophenyl and X is selected from the group consisting of —CN and —COOR′ wherein R′ is an alkyl radical containing 1–4 carbon atoms.

2. The method according to claim 1 wherein said compound is α-cyano-β-phenylacrylonitrile.

3. The method according to claim 1 wherein said compound is diethyl ethylidene malonate.

4. The method according to claim 1 wherein said compound is α-cyano-β-(o-chlorophenyl)acrylonitrile.

5. The method according to claim 1 wherein said compound is α-cyano-β-(p-chlorophenyl)acrylonitrile.

References Cited in the file of this patent
UNITED STATES PATENTS

| | | |
|---|---|---|
| 2,043,941 | Williams | June 9, 1936 |
| 2,458,017 | Mowry | Jan. 4, 1949 |
| 2,790,819 | Godfrey | Apr. 30, 1957 |

OTHER REFERENCES

Bellack et al.: p. 61, code No. 960; 124, code No. 2572.
Agr. Handbook, page 237, item Nos. 7356 and 7345.
Mean on Mice, Pests, January 1949, pp. 6–11.
Jour. Am. Pharm. Asso., November 1947, pp. 350–352.
Bellack et al.: Chem. Biol. Coordination Center Rev., No. 5, May 3, 1952, code 1286, p. 57.
U.S. Dept. Agr. Handbook, vol. 69, pp. 222–224.